US010486537B2

(12) United States Patent
Rozman et al.

(10) Patent No.: US 10,486,537 B2
(45) Date of Patent: Nov. 26, 2019

(54) POWER GENERATING SYSTEMS HAVING SYNCHRONOUS GENERATOR MULTIPLEX WINDINGS AND MULTILEVEL INVERTERS (71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 590 days.

(21) Appl. No.: 15/249,639

(22) Filed: Aug. 29, 2016

(65) Prior Publication Data
US 2018/0056793 A1    Mar. 1, 2018

(51) Int. Cl.
B60L 11/08 (2006.01)
H02K 1/12 (2006.01)
H02K 1/22 (2006.01)
H02K 7/18 (2006.01)
H02K 19/16 (2006.01)
H02P 25/22 (2006.01)
H02P 27/14 (2006.01)
H02M 7/483 (2007.01)
(Continued)

(52) U.S. Cl.
CPC ............... B60L 11/08 (2013.01); B60L 50/13 (2019.02); B60L 53/20 (2019.02); H02K 1/12 (2013.01); H02K 1/223 (2013.01); H02K 7/1815 (2013.01); H02K 19/16 (2013.01); H02M 7/483 (2013.01); H02P 5/74 (2013.01); H02P 25/22 (2013.01); H02P 27/14 (2013.01)

(58) Field of Classification Search
CPC ............................... H02K 1/223; H02K 19/16
USPC ................................................... 318/139, 34
See application file for complete search history.

(56) References Cited

U.S. PATENT DOCUMENTS 5,917,295 A * 6/1999 Mongeau ................ H02P 27/08
                                                              318/290
6,058,031 A * 5/2000 Lyons .................... H02M 7/487
                                                              363/132
(Continued)

FOREIGN PATENT DOCUMENTS

CN        203056806 U     7/2013
EP        0881752 A1     12/1998
(Continued)

OTHER PUBLICATIONS

European Search Report, European Application No. 17184013.5, dated Jan. 22, 2018, European Patent Office; European Search Report 7 pages.

(Continued)

Primary Examiner — David Luo
(74) Attorney, Agent, or Firm — Cantor Colburn LLP (57) ABSTRACT Multiplex winding synchronous power generating systems and vehicle power systems are provided that include a rotating part including a plurality of windings, a primer mover configured to drive the rotating part, a stator part having a plurality of windings, a plurality of rectifiers, three 3-phase 5-level motor drives, at least one H-bridge, at least one 3-phase AC motor, and a generator voltage regulator that regulates current of voltages of local DC busses of the three 3-phase 5-level motor drives.

16 Claims, 9 Drawing Sheets (51) Int. Cl.
*H02P 5/74* (2006.01)
*B60L 50/13* (2019.01)
*B60L 53/20* (2019.01)

(56) References Cited

U.S. PATENT DOCUMENTS

| | | | |
|---|---|---|---|
| 6,697,271 B2 | 2/2004 | Corzine | |
| 8,093,857 B1 | 1/2012 | Kolomeitsev | |
| 8,896,252 B2* | 11/2014 | Yamada | B60L 15/20 |
| | | | 318/400.26 |
| 8,982,593 B2 | 3/2015 | Nondahl et al. | |
| 9,083,274 B2* | 7/2015 | Liu | H02P 3/22 |
| 9,209,741 B2 | 12/2015 | Gao et al. | |
| 9,287,745 B2* | 3/2016 | Akatsu | H02K 3/20 |
| 9,325,229 B2 | 4/2016 | Rozman et al. | |
| 2006/0006655 A1 | 1/2006 | Kanazawa | |
| 2008/0103632 A1 | 5/2008 | Saban et al. | |
| 2009/0146595 A1 | 6/2009 | Immler | |
| 2010/0133816 A1 | 6/2010 | Abolhassani et al. | |
| 2010/0244599 A1 | 9/2010 | Saban et al. | |
| 2015/0349598 A1 | 12/2015 | Gieras et al. | |

FOREIGN PATENT DOCUMENTS

| | | |
|---|---|---|
| EP | 2259422 A1 | 12/2010 |
| EP | 2725689 | 4/2014 |
| GB | 2506719 A | 4/2014 |
| JP | 2015080283 A | 4/2015 |
| WO | 2012016062 A2 | 2/2012 |

OTHER PUBLICATIONS

International Search Report, International Application No./Patent No. 15168153.3-1809/2999091, dated Apr. 22, 2016, European Patent Office; International Search Report 9 pages.
L. Alberti, N. Bianchi, Experimental Tests of Dual Three-Phase Induction Motor UnderFaulty Operating Condition, IEEE Trans. on Industrial Electronics, vol. 59, No. 5, May 2012, pp. 2041-2048.
M. Popescu, D. G. Dorrell, L. Alberti, N. Bianchi, D. A. Staton, and D. Hawkins, ThermalAnalysis of Duplex Three-Phase Induction Motor Under Fault Operating Conditions, IEEETrans. on Industry Applications, vol. 49, No. 4, Jul./Aug. 2013, pp. 1523-1531.

* cited by examiner

POWER GENERATING SYSTEMS HAVING SYNCHRONOUS GENERATOR MULTIPLEX WINDINGS AND MULTILEVEL INVERTERS

BACKGROUND

The subject matter disclosed herein relates to power generating systems, and, more particularly, to power generating systems having synchronous generators with multiplex windings and multilevel inverters.

Ground vehicles, such as military vehicles, construction equipment, etc. have large electric drives that require advanced power systems to meet high power demands (e.g., >250 kW). To provide such high power levels, multilevel topologies have been considered to achieve low harmonic distortion with moderate switching frequency and reduced electromagnetic interference ("EMI") emissions compared to a standard 2-level active rectifier-inverter system. Multi-level inverters function to synthesize a desired voltage from several levels of DC voltages (e.g., from multiple sources). A cascaded H-bridges inverter can be used to drive traction motors and other motor driven loads and requires multiple isolated DC power sources. Multiple isolated DC power sources can be achieved by generators with multi-channel configurations. One application of such multi-channel configurations is "duplex" or "multiplex" stator (armature) winding. Duplex stator winding configurations are typically used in induction machines. Induction machines with duplex stator windings include, but are not limited to, simple and cost-effective solutions for six-phase operation using two sets of three-phase subsystems, fault-tolerant applications, and/or reduction of cross section of magnet wire and terminal leads. Wound-field and permanent magnet (PM) brushless machines belong to the family of synchronous machines. Applications of duplex windings to synchronous machines may be associated with a risk of current unbalance and circulating currents. These effects can lead to immediate thermal damage of the stator winding insulation due to overheating. Thus, improved multiplex winding systems may be desirable.

SUMMARY

According to one embodiment, a multiplex winding synchronous power generating system includes a rotating part including a plurality of windings, a primer mover configured to drive the rotating part, a stator part having a plurality of windings, a plurality of rectifiers, three 3-phase 5-level motor drives, at least one H-bridge, at least one 3-phase AC motor, and a generator voltage regulator that regulates current of voltages of local DC busses of the three 3-phase 5-level motor drives.

In addition to one or more of the features described above, or as an alternative, further embodiments of the multiplex winding synchronous power generating system may include that the plurality of rectifiers comprise passive or active rectifiers.

In addition to one or more of the features described above, or as an alternative, further embodiments of the multiplex winding synchronous power generating system may include that the prime mover is an internal combustion engine.

In addition to one or more of the features described above, or as an alternative, further embodiments of the multiplex winding synchronous power generating system may include that the plurality of rectifiers are housed within a housing of the stator part.

In addition to one or more of the features described above, or as an alternative, further embodiments of the multiplex winding synchronous power generating system may include that the stator part, the rectifiers, and the rotating part are all housed within the same housing.

In addition to one or more of the features described above, or as an alternative, further embodiments of the multiplex winding synchronous power generating system may include a plurality of batteries electrically connected to the local busses.

In addition to one or more of the features described above, or as an alternative, further embodiments of the multiplex winding synchronous power generating system may include that the at least one 3-phase AC motor is three 3-phase AC motors and each of the three 3-phase AC motors is electrically connected to a separate one of the three 3-phase 5-level motor drives.

In addition to one or more of the features described above, or as an alternative, further embodiments of the multiplex winding synchronous power generating system may include that the plurality of passive rectifiers comprises six diodes.

In addition to one or more of the features described above, or as an alternative, further embodiments of the multiplex winding synchronous power generating system may include that the at least one H-bridge is three H-bridges, wherein a respective one of the three H-bridges is configured with one of the three 3-phase 5-level motor drives.

In addition to one or more of the features described above, or as an alternative, further embodiments of the multiplex winding synchronous power generating system may include that the rotating part includes a permanent magnet system that creates constant magnetic flux.

According to another embodiment, a vehicle power system is provided that includes a multiplex winding synchronous power generating system. The multiplex winding synchronous power generating system includes a rotating part including a plurality of windings, a primer mover configured to drive the rotating part, a stator part having a plurality of windings, a plurality of rectifiers, three 3-phase 5-level motor drives, at least one H-bridge, at least one 3-phase AC motor, and a generator voltage regulator that regulates current of voltages of local DC busses of the three 3-phase 5-level motor drives.

In addition to one or more of the features described above, or as an alternative, further embodiments of the vehicle power system may include that the prime mover is an internal combustion engine of the vehicle.

In addition to one or more of the features described above, or as an alternative, further embodiments of the vehicle power system may include that the plurality of rectifiers comprise passive or active rectifiers.

In addition to one or more of the features described above, or as an alternative, further embodiments of the vehicle power system may include that the plurality of rectifiers are housed within a housing of the stator part.

In addition to one or more of the features described above, or as an alternative, further embodiments of the vehicle power system may include a plurality of batteries electrically connected to the local DC busses and consequently to the three 3-phase 5-level motor drives, wherein the three 3-phase 5-level motor drives may charge the plurality of batteries during motor regeneration.

In addition to one or more of the features described above, or as an alternative, further embodiments of the vehicle power system may include a plurality of batteries electrically connected to the local DC busses, wherein the plurality of rectifiers are active rectifiers and wherein the plurality of batteries may charge by the plurality of active rectifiers.

In addition to one or more of the features described above, or as an alternative, further embodiments of the vehicle power system may include that the at least one 3-phase AC motor is three 3-phase AC motors and each of the three 3-phase AC motors is electrically connected to a separate one of the three 3-phase 5-level motor drives.

In addition to one or more of the features described above, or as an alternative, further embodiments of the vehicle power system may include a plurality of batteries and wherein the plurality of rectifiers are passive rectifiers, the plurality of batteries configured to allow starting of the vehicle from the batteries in case the passive rectifiers are replaced by active rectifiers located externally to the generator housing In addition to one or more of the features described above, or as an alternative, further embodiments of the vehicle power system may include that the at least one H-bridge is three H-bridges, wherein a respective one of the three H-bridges is configured with one of the three 3-phase 5-level motor drives.

In addition to one or more of the features described above, or as an alternative, further embodiments of the vehicle power system may include that the rotating part includes a permanent magnet system that creates constant magnetic flux.

Other aspects, features, and techniques of embodiments of the present disclosure will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
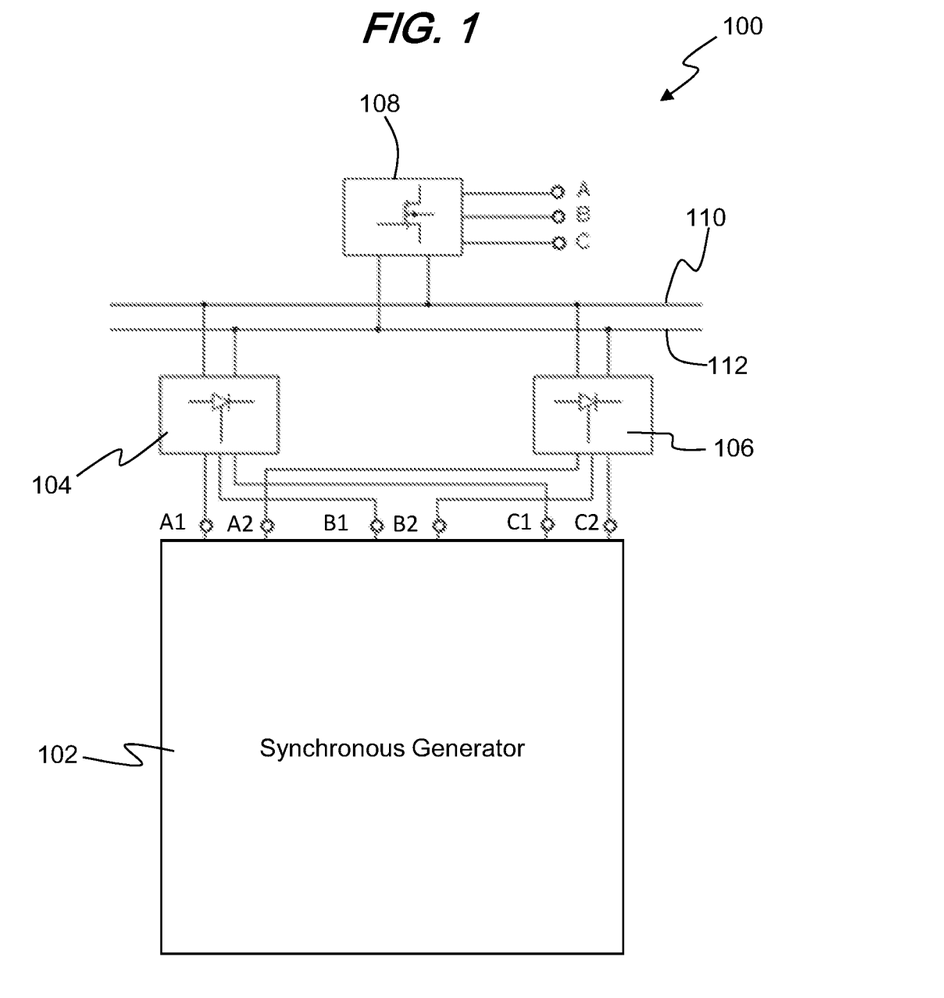
FIG. 1 is a schematic diagram of a circuit topology of a synchronous power generating system in accordance with an embodiment of the present disclosure.

With reference to the figures, FIG. 1 depicts an example circuit topology of a power generating system 100 having a synchronous generator 102 and a duplex stator winding configuration with a single bus. Synchronous generator 102 can be a wound-field or permanent magnet (PM) synchronous generator 102 for supplying AC power through a duplex stator winding 3-phase subsystem. The synchronous generator 102 is structurally formed from a plurality of windings wrapped around a core (e.g., stator and rotor with respective armature winding and field winding). The windings can be positioned within slots that are configured to receive a respective winding.

Wound-field and permanent magnet (PM) brushless machines belong to the family of synchronous machines. Applications of duplex windings to synchronous machines may be associated with a risk of current imbalance and circulating currents as discussed above and can lead to thermal damage of the stator winding insulation due to overheating. There is always a certain phase shift between electromagnetic fields (EMF) induced in phase windings belonging to two sets of three-phase subsystems. Such phase shift can be caused by distribution of coils in slots, asymmetry in coils, or both.

In an embodiment, the synchronous generator 102 can include a multiplex stator winding configuration for providing multiple phase AC power. For example, a duplex stator winding configuration includes two redundant 3-phase subsystems that represent two independent three-phase channels. Each three-phase channel is connected to one of a first or second rectifier 104, 106, as shown in FIG. 1. Each rectifier 104, 106 converts 3-phase AC power to direct current (DC) power.

For example, a three-phase subsystem can be electrically connected to the first rectifier 104 through terminal leads A1, B1, C1, and a second three-phase subsystem is electrically connected to the second rectifier 106 through terminal leads A2, B2, C2. In a non-limiting example, rectifiers 104, 106 can be active (e.g., controlled) or passive (e.g., uncontrolled) rectifiers. In an embodiment, rectifiers 104, 106 are active rectifiers that are connected to a processor having instructions for implementing a DC load sharing algorithm that controls DC power at half-power during normal conditions and full power during failure of the other active rectifier or one or more windings in synchronous generator 102. DC power from rectifiers 104, 106 supplies DC current and voltage to respective first and second DC busses 110, 112, as shown.

An optional three-phase inverter 108 electrically connects to first and second DC bus 110, 112 for converting DC power to AC power. A processor can be configured to control inverter 108 in order to adjust a frequency and output voltage of AC power to desired values. Such configuration enables parallel DC output from first and second DC busses 110, 112 that have reduced parasitic effects of current imbalance and/or circulating currents that are generally associated with multiplex wound synchronous generators in conventional systems.

Figure 2A:
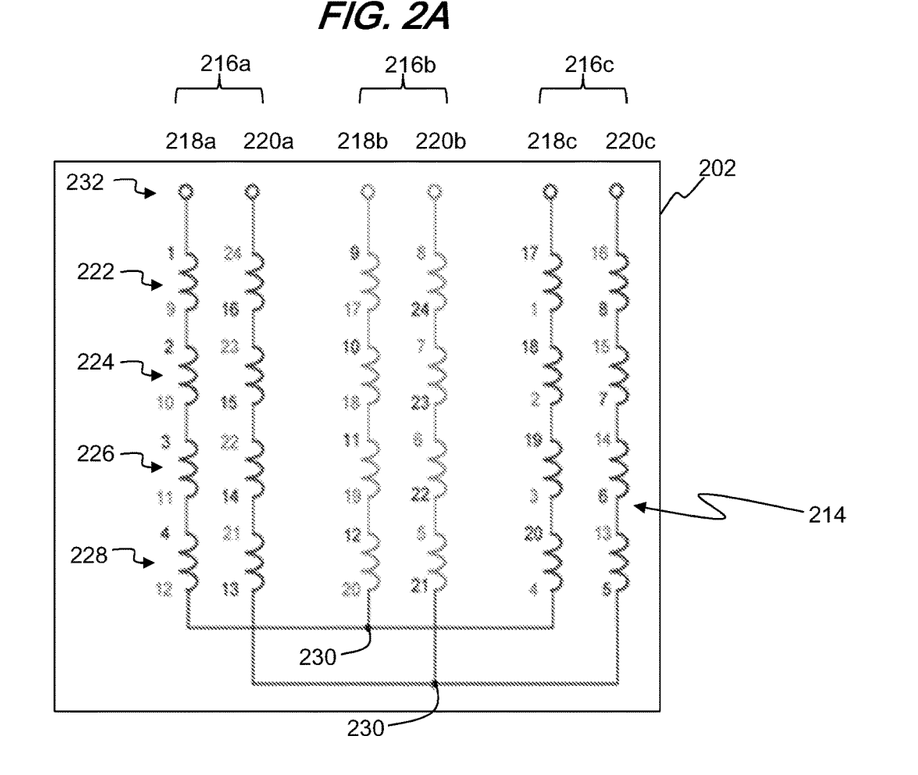
FIG. 2A is a schematic diagram of a coil winding configuration of the power generating system of FIG. 1 in accordance with an embodiment of the present disclosure.
Figure 2B:
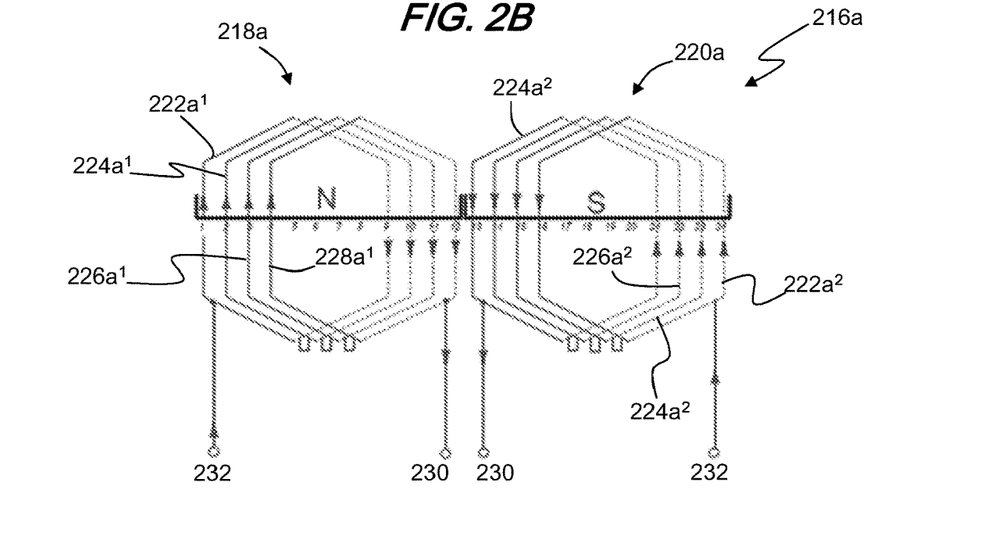
FIG. 2B is a schematic diagram of an arrangement of coil windings of a first phase of the coil winding configuration of FIG. 2A in accordance with an embodiment of the present disclosure.
Figure 2C:
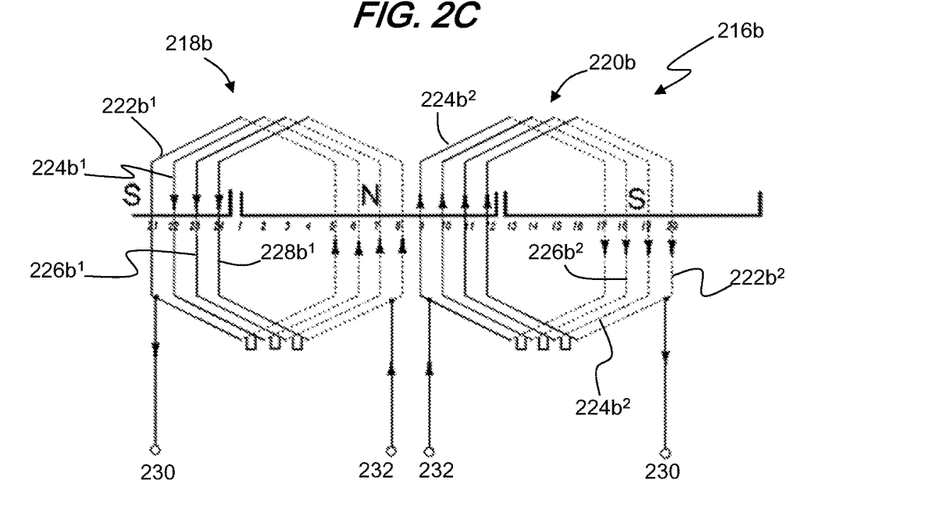
FIG. 2C is a schematic diagram of an arrangement of coil windings of a second phase of the coil winding configuration of FIG. 2A in accordance with an embodiment of the present disclosure.

Turning now to FIGS. 2A-2D, an example three-phase, duplex-winding configuration of a synchronous generator 202 is shown. FIG. 2A illustrates a schematic view of a three-phase, duplex-stator winding configuration 214 for a stator (armature) of the synchronous generator 202. FIG. 2B is a schematic illustration of coil windings of the first phase 216a of the synchronous generator 202. FIG. 2C is a schematic illustration of coil windings of the second phase 216b of the synchronous generator 202. FIG. 2C is a schematic illustration of coil windings of the third phase 216c of the synchronous generator 202.

Figure 2D:
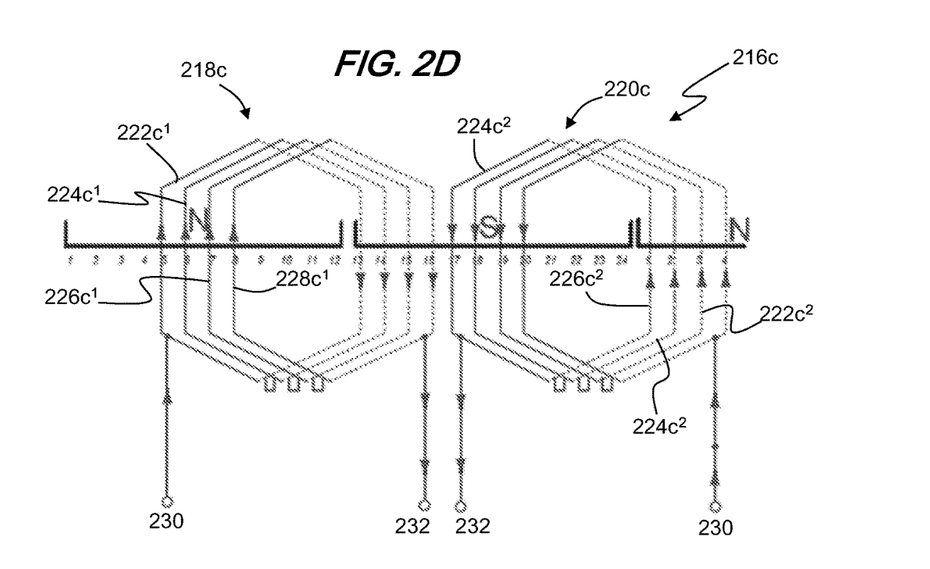
FIG. 2D is a schematic diagram of an arrangement of coil windings of a third phase of the coil winding configuration of FIG. 2A in accordance with an embodiment of the present disclosure.

FIGS. 2A-2C illustrate a dual three-phase system subsystems of the synchronous generator 202, i.e., a first phase 216a, a second phase 216b, and a third phase 216c (collectively phases 216). Each phase 216 consists of two groups of windings (first winding 218 and second winding 220). That is, the first phase 216a includes a respective first winding 218a and a respective second winding 220a, the second phase 216b includes a respective first winding 218b and a respective second winding 220b, and the third phase 216c includes a respect first winding 218c and a respective second winding 220c. Each winding 218, 220 includes four respective coils 222, 224, 226, 228. As such, each winding 218, 220 includes two sets of completely independent windings on the same stator for providing a duplex stator winding three-phase system. As shown in FIG. 2A, the numbers 1, 2, 3, . . . , 24 labeled beside coil terminals corresponds to the number of slots (e.g., as shown in FIGS. 2B-2D) in which coils of the windings 218, 220 are located.

In the embodiment of FIGS. 2A-2C, the three-phase, duplex-stator winding configuration 214 includes an arrangement of power coils distributed in twenty-four slots of a stator in order to supply three-phase or six-phase power, as will be appreciated by those of skill in the art. As noted, each phase 216 consists of four coils 222, 224, 226, 228 per winding 218, 220. The windings 218, 220 of the phases 216 extend from separate neutral points 230 that are galvanically isolated to respective terminal leads 232.

In such a twenty-four slot example, in the first winding 218a, a first coil winding 222 is distributed in slots 1-9, a second coil winding 224 is distributed in slots 2-10, a third coil winding 226 is distributed in slots 3-11, and a fourth coil winding 4-12 is distributed in slots 4-12, with coil windings 222, 224, 226, 228 forming a circuit in series with the terminal lead 232 and the neutral point 230. In some embodiments, the terminal leads of the phases 216 are connected in parallel. Similar coil winding configured for the windings 218, 220 can be provided with a connection to the neutral point(s) 230 and respective terminal leads 232. It is to be appreciated that duplex or multiplex windings can be used with stator laminations having typical slot shapes. Also, standard stator windings, e.g., lap or concentric coil windings with a minimum of two coil groups per phase can be used to create duplex or multiplex stator windings.

FIG. 2B illustrates an example arrangement of coil windings 222, 224, 226, 228 of the first phase 216a having respective first winding 218a and second winding 220a of the synchronous generator 202 in accordance with an embodiment of the present disclosure. As shown in FIG. 2B, the first winding 218a of the first phase 216a includes an arrangement of first coil windings $222a^1$, $224a^1$, $226a^1$, $228a^1$ in series that begins at a respective terminal lead 232, continues with a series distribution arrangement in slots 1-9, 2-10, 3-11, and 4-12 under an N-pole, and terminates at the neutral point 230. Similarly, the second winding 220 includes an arrangement of second coil windings $222a^2$, $224a^2$, $226a^2$, $228a^2$ in series that begins at a respective terminal lead 232, continues with a series distribution arrangement in slots 24-16, 23-15, 22-14, and 21-13 under an S-pole, and terminates at the neutral point 230.

FIG. 2C illustrates an example arrangement of coil windings 222, 224, 226, 228 of the second phase 216b having respective first winding 218b and second winding 220b of the synchronous generator 202 in accordance with an embodiment of the present disclosure. As shown in FIG. 2C, the first winding 218b of the second phase 216b includes an arrangement of first coil windings $222b^1$, $224b^1$, $226b^1$, $228b^1$ in series that begins at a respective terminal lead 232, continues with a series distribution arrangement in slots 9-17, 10-18, 11-19, and 12-20 under S- and N-poles (i.e., slots 17, 18, 19, 20 under an S-pole; slots 9, 10, 11, 12 under an N-pole), and terminates at the neutral point 230. Similarly, the second winding 220b includes an arrangement of second coil windings $222b^2$, $224b^2$, $226b^2$, $228b^2$ in series that begins at a respective terminal lead 232, continues with a series distribution arrangement in slots 8-24, 7-23, 6-22, and 5-21 under N- and S-poles (slots 5, 6, 7, 8 under an N-pole; slots 21, 22, 23, 24 under an S-pole), and terminates at the neutral point 230.

FIG. 2D illustrates an example arrangement of coil windings 222, 224, 226, 228 of the third phase 216c having respective first winding 218c and second winding 220c of the synchronous generator 202 in accordance with an embodiment of the present disclosure. As shown in FIG. 2D, the first winding 218c of the third phase 216c includes an arrangement of first coil windings $222c^1$, $224c^1$, $226c^1$, $228c^1$ in series that begins at a respective terminal lead 232, continues with a series distribution arrangement in slots 4-20, 3-19, 2-18, and 1-17 under N- and S-poles (i.e., slots 1, 2, 3, 4 under an N-pole; slots 17, 18, 19, 20 under an S-pole), and terminates at the neutral point 230. Similarly, the second winding 220c includes an arrangement of second coil windings $222c^2$, $224c^2$, $226c^2$, $228c^2$ in series that begins at a respective terminal lead 232, continues with a series distribution arrangement in slots 5-13, 6-14, 7-15, and 8-16 under N- and S-poles (slots 5, 6, 7, 8 under an N-pole; slots 13, 14, 15, 16 under an S-pole), and terminates at the neutral point 230.

Figure 3:
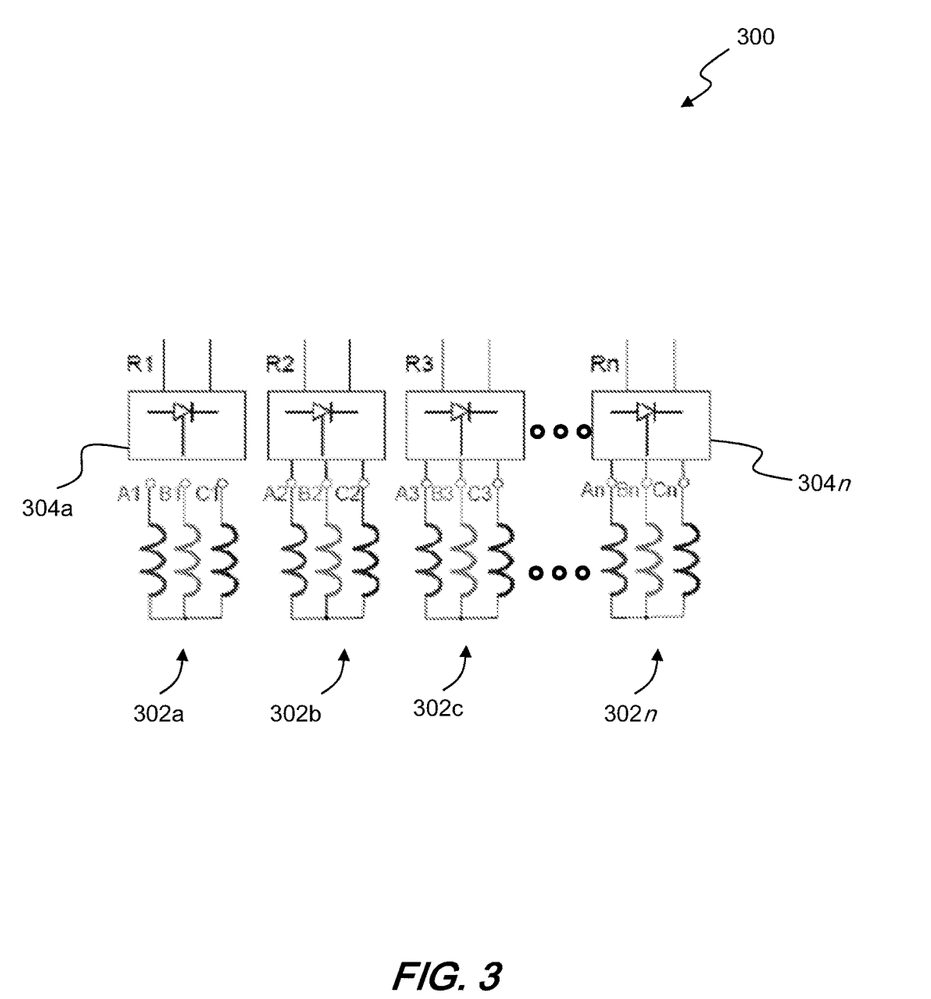
FIG. 3 is a schematic diagram of a synchronous power generating system in accordance with an embodiment of the present disclosure.

Turning now to FIG. 3, a schematic depiction of an embodiment of a wound-field or PM synchronous generator utilizing a multiplex stator winding configuration in accordance with an embodiment of the present disclosure is shown. A power generating system 300 can be formed having a multiple-phase system with four or more coils per phase in order to provide multiple-phase AC power to respective rectifiers 304a-304n. Power generating system 300 includes a multiplex stator winding configuration with multiple and parallel 3-phase subsystems 302a-302n having n independent channels to supply multiple phase AC power to the respective rectifiers 304a-304n. In one non-limiting example, a two-pole synchronous machine with thirty-six slots and three independent channels can be created from the windings. In another embodiment, a two-pole synchronous machine with forty-eight slots having four channels can be created. Further still, in another embodiment, a two-pole synchronous machine having sixty slots with five channels can be created. In various non-limiting embodiments, the rectifiers 304a-304n can be active (e.g., controlled) or passive (e.g., uncontrolled) rectifiers. In one non-limiting embodiment, the rectifiers 304a-304n are active rectifiers that are controlled by a processor with instructions that implement a DC load sharing algorithm that provides DC power to one or more DC busses.

Figure 4:
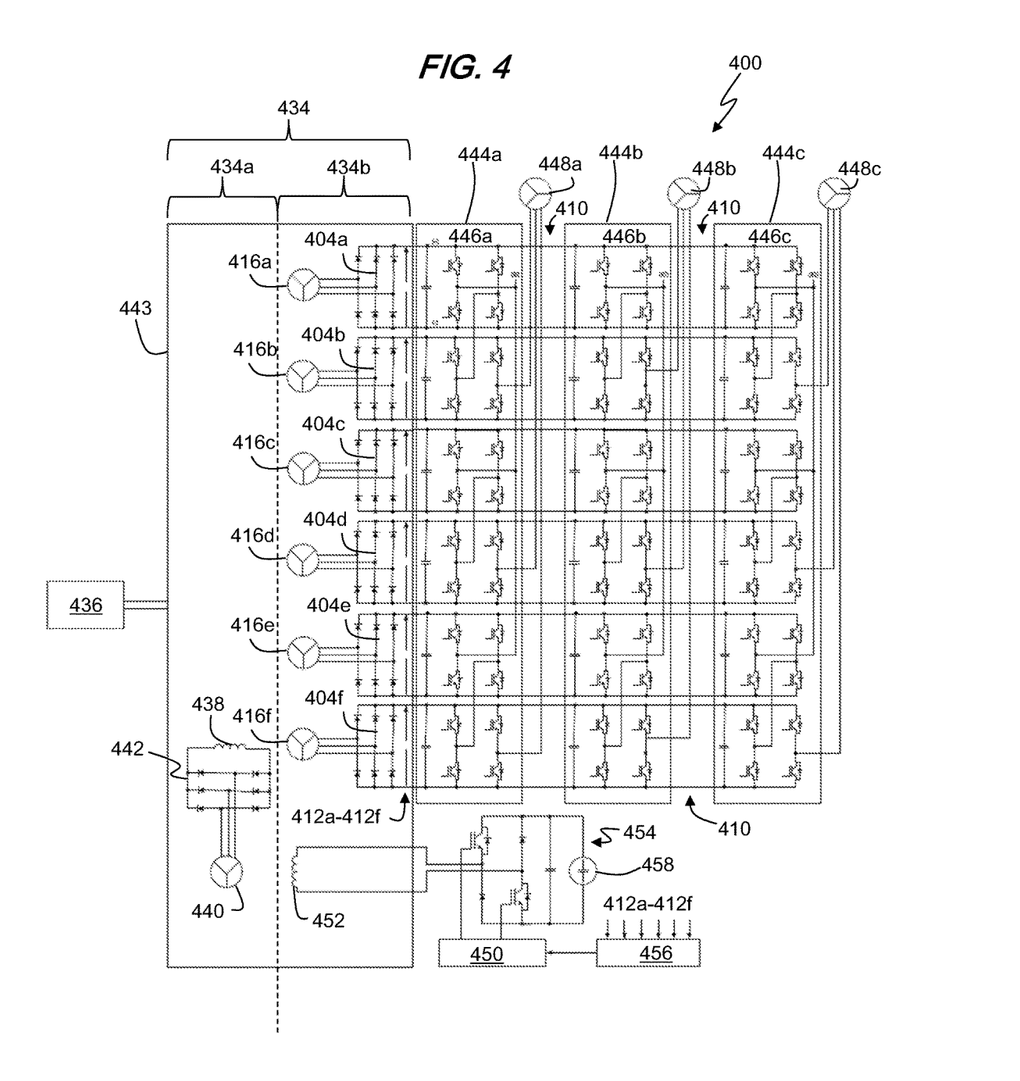
FIG. 4 is a schematic diagram of a multilevel power generating system having a multi-channel wound field synchronous generator in accordance with an embodiment of the present disclosure.

Turning now to FIG. 4, an example embodiment in accordance with the present disclosure is shown. FIG. 4 schematically illustrates a power generating system 400 and includes a wound field synchronous generator 434 having a rotating part 434a and a stator part 434b. The rotating part 434a is driven by a prime mover 436 and includes a main field winding 438, an exciter armature winding 440, and a rotating rectifier 442.

As shown, a set of six passive rectifiers 404a-404f are located within a housing 443 of the generator 434. In some embodiments, the passive rectifiers can be diodes. Three 3-phase 5-level motor drives 444a, 444b, 444c are configured to utilize positive/negative DC busses 410, cascaded H-bridges 446a, 446b, 446c, respective 3-phase AC motors 448a, 448b, 448c, and a generator voltage regulator 450. The generator voltage regulator 450 regulates current in an exciter field winding 452 via an asymmetric H-bridge 454 in response to an averaging 456 of voltages of local DC busses 412a-412f. An external DC power supply 458 can be a battery or a rectified voltage from a separate permanent magnet generator driven by the same prime mover 436.

Figure 5:
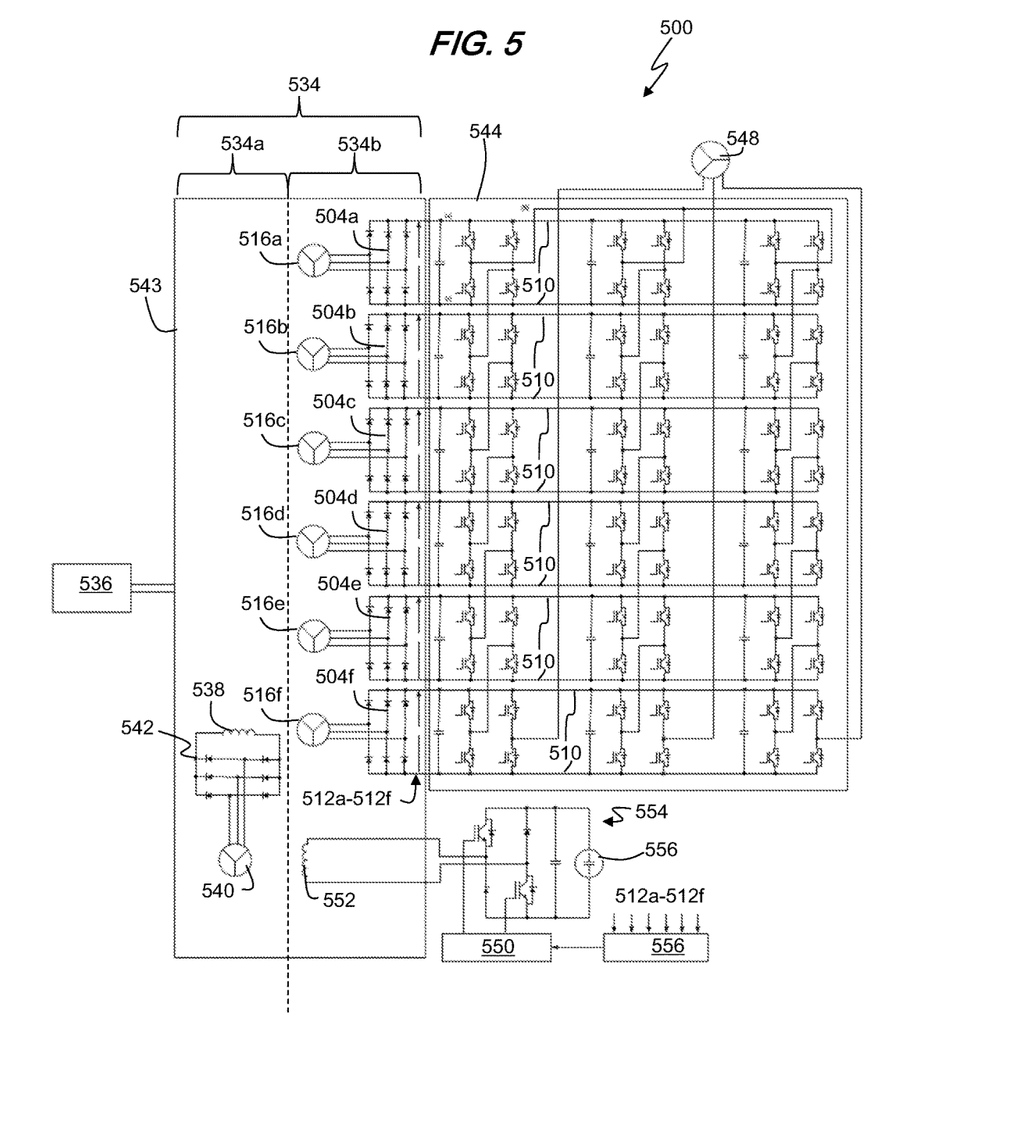
FIG. 5 is a schematic diagram of another multilevel power generating system having a multi-channel wound field synchronous generator in accordance with an embodiment of the present disclosure.

Turning now to FIG. 5, an alternative example embodiment in accordance with the present disclosure is shown. FIG. 5 schematically illustrates a power generating system 500 and includes a wound field synchronous generator 534 having a rotating part 534a and a stator part 534b. The rotating part 534a is driven by a prime mover 536 and includes a main field winding 538, an exciter armature winding 540, and a rotating rectifier 542.

As shown, a set of six passive rectifiers 504a-504f are located within a housing 543 of the generator 534. A 3-phase 13-level motor drive 544 is configured to utilize positive/negative DC busses 510, cascaded H-bridges (similar to that shown in FIG. 4), a 3-phase AC motor 548, and a generator voltage regulator 550. The generator voltage regulator 550 regulates current in an exciter field winding 552 via an asymmetric H-bridge 554 in response to an averaging 556 of voltages of local DC busses 512a-512f. An external DC power supply 558 can be a battery or a rectified voltage from a separate permanent magnet generator driven by the same prime mover 536.

The single 3-phase 13-level motor drive 544 can power a high voltage high power AC motor (e.g., motor 548). A multilevel system architecture, such as shown in FIG. 5, can significantly reduce electromagnetic interference emission noise and voltage stresses on the motor windings.

Figure 6:
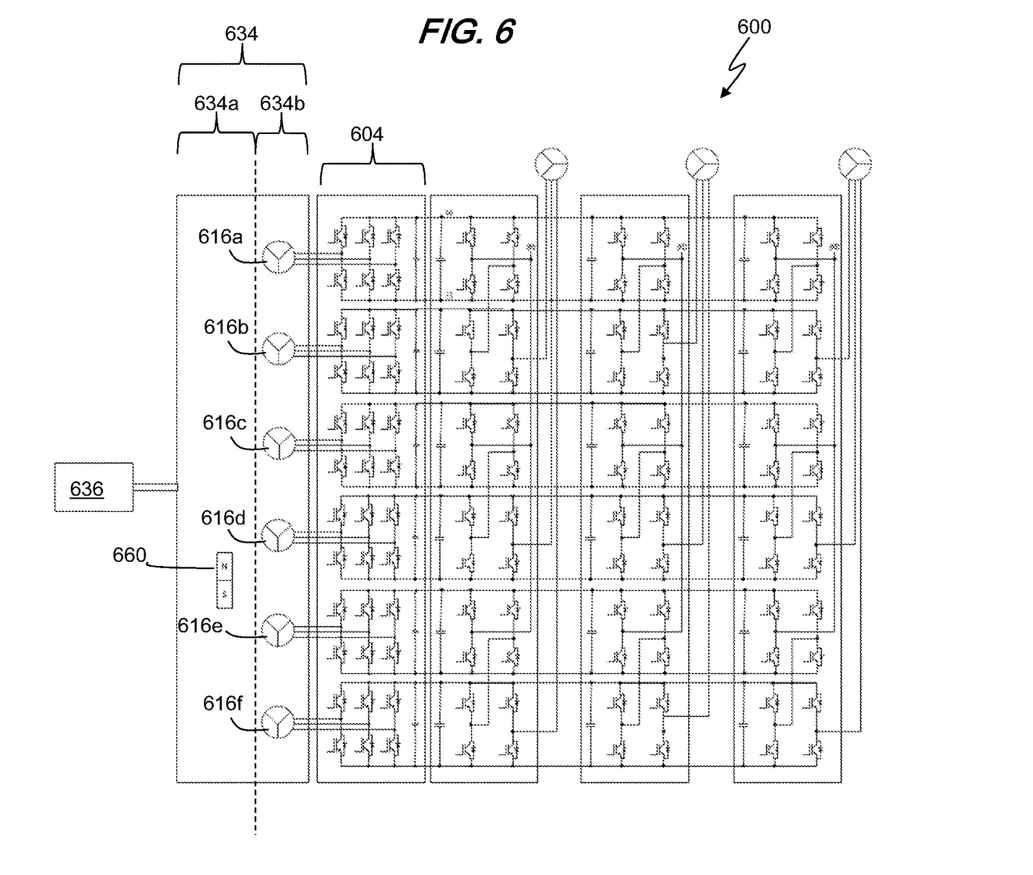
FIG. 6 is a schematic diagram of a multilevel power generating system having a multi-channel permanent magnet synchronous generator in accordance with an embodiment of the present disclosure.

Turning now to FIG. 6, another embodiment of the present disclosure having a multilevel system architecture with a multi-channel, permanent magnet synchronous generator is schematically shown. FIG. 6 schematically illustrates a power generating system 600 and includes a permanent magnet synchronous generator 634 having a permanent magnet system 660. In some embodiments the permanent magnet system 660 may be a permanent magnet system that creates constant magnetic flux, e.g., an unregulated permanent magnet. The permanent magnet synchronous generator 634 includes a rotating part 634a and a stator part 634b. The rotating part 634a is driven by a prime mover 636.

As shown, an active rectifier configuration 604 is located separately from the generator 634. As shown, the active rectifier configuration 604 includes six 3-phase, 2-level active rectifiers. In this embodiment, passive rectifiers (as provided in embodiments described above) are replaced with a set of multiple 3-phase 2-level active rectifiers that control voltage of local DC busses. Such topology may improve efficiency of the generator and enable engine start mode by operating an active rectifier as a motor drive.

Figure 7:
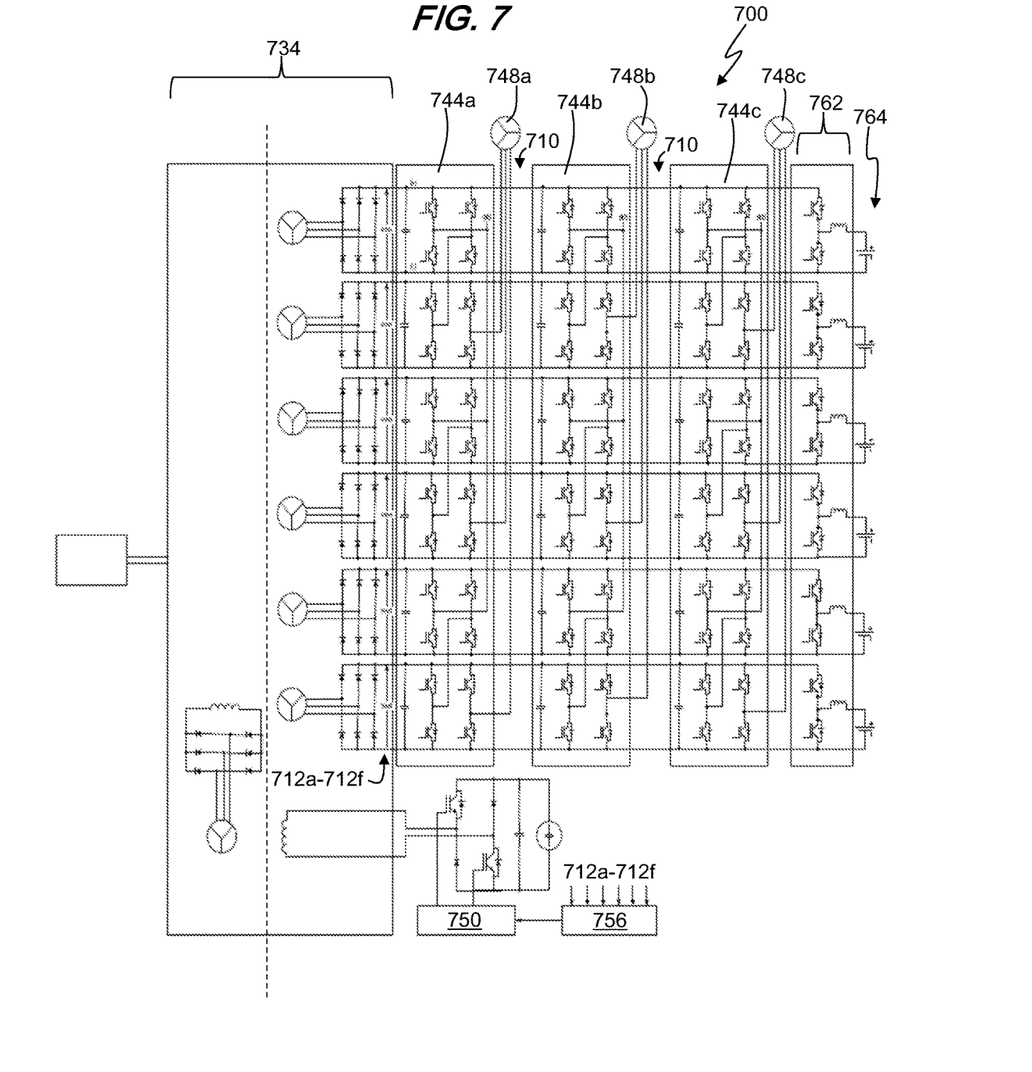
FIG. 7 is a schematic diagram of a multilevel power generating system having a multi-channel wound field synchronous generator in accordance with an embodiment of the present disclosure configured for voltage balancing and battery charging.

Turning now to FIG. 7, a multilevel power generating system 700 with a multi-channel wound field synchronous generator 734 having output rectifiers is schematically shown. The power generating system 700 further includes voltage balancing/battery charging DC-DC converters 762, batteries 764, and three 3-phase 5-level motor drives 744a, 744b, 744c to power motor driven loads (e.g., motors 748a, 748b, 748c). As shown in FIG. 7, batteries 764 are attached to each of the local busses via bidirectional DC-DC converters 762. Such architecture can support a "silent" mode of a vehicle by powering motor driven loads without running the vehicle's engine. The bidirectional DC-DC converter 764 has two functions: charging the batteries and balancing the voltages on the local DC busses. The voltage across each of the DC busses may not be equal due to differences in generator windings impedance. Imbalanced local DC busses may cause harmonic distortions of the output waveforms. To maintain the balance of the local DC bus, a voltage regulator 750 is responsive to the highest voltage level from the DC busses 710. The highest voltage is derived at the output of voltage selector 756 from the voltages 712a-712f. The rest of the DC bus voltages are balanced by using the DC-DC converters 762 in a boost mode.

Figure 8:
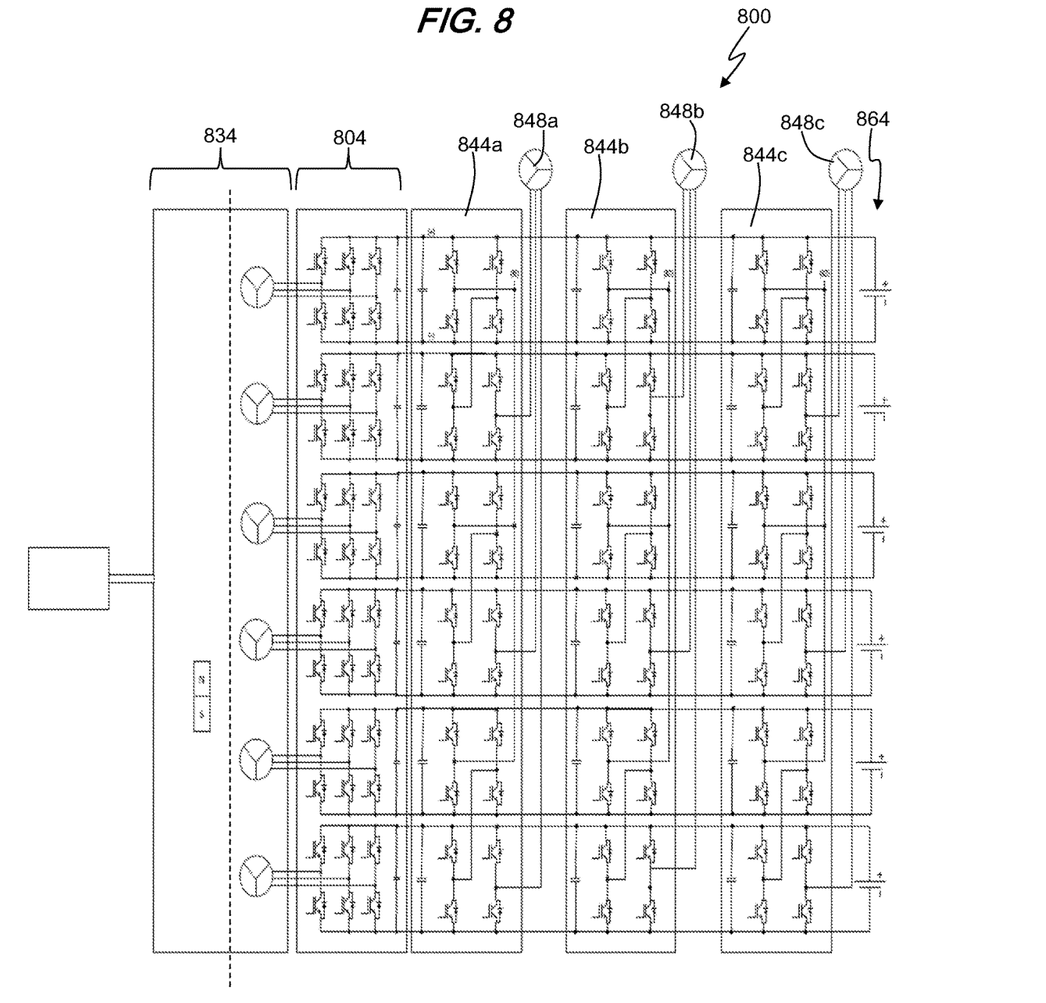
FIG. 8 is a schematic diagram of a multilevel power generating system having a multi-channel permanent magnet synchronous generator in accordance with an embodiment of the present disclosure configured for voltage balancing and battery charging.

Turning now to FIG. 8, a multilevel power generating system 800 with a multi-channel permanent magnet synchronous generator 834, multi-channel active rectifier 804, batteries 864, and three 3-phase 5-level motor drives 844a, 844b, 844c to power motor driven loads (e.g., motors 848a, 848b, 848c). As shown in FIG. 8, the batteries 864 are attached to each of the local DC busses, as will be appreciated by those of skill in the art. This arrangement in addition to the "silent" mode, described above, enables an engine start from the batteries of a vehicle. A battery charging function is performed by the active rectifiers 804. The active rectifiers 804 also ensure a proper balancing of local DC busses.

Applications of the present disclosure, in accordance with the example embodiments described above, can includes various power systems. For example, vehicles may have large electric drives that require advanced power systems to meet high power demands (e.g., >250 kW). Such vehicles may include various types of ground vehicles, including, but not limited to, military vehicles, large construction vehicles, rescue vehicles, etc. Multilevel topologies as provided herein can be used to achieve low harmonic distortion with moderate switching frequency and reduced EMI emissions compared to a standard 2-level active rectifier/inverter system. Further, a cascaded H-bridges inverter can be used to drive traction motors and other motor driven loads and may require multiple isolated DC power sources using electrical machines.

Electric power generating system architectures, as provided herein, include a wound field synchronous generator driven by a prime mover, a set of passive rectifiers located within a generator housing, 3-phase 5-level motor drives utilizing cascaded H-bridges, 3-phase AC motors, and a generator voltage regulator are employed. In some embodiments, six passive rectifiers and three 3-phase motor drives can be used. The generator voltage regulator regulates current in the exciter field winding via asymmetric H-bridge in response to the average voltage of local DC busses or highest with coordination of DC-DC converters for voltage balancing across DC local busses.

Advantageously, embodiments described herein provide for synchronous generators having increased reliability and redundancy in synchronous generators and improved fault tolerance. Also, the stator winding configuration excludes current unbalance or circulating currents in duplex or multiplex windings connected in parallel. Typical stator laminations with typical slot shapes can be used by embodiments described herein. Further, standard stator windings, e.g., lap or concentric coil windings with minimum two coil groups per phase can create a duplex or multiplex winding. The coil winding configuration can reduce the cross-section of terminal leads of individual windings in each phase of a three-phase subsystem. Use of low voltage power modules can be used to achieve high voltage, high power inverters in accordance with the present disclosure.

Furthermore, embodiments provided herein can improve electrical power systems integration that can result in relatively compact packaging as compared to traditional systems. Moreover, embodiments provided herein may provide significant reduction in electromagnetic interference emissions, which can result in weight/size improvements of electromagnetic interference filters. Additionally, embodiments of the present disclosure can eliminate relatively large, bulky, heavy, etc. DC-link capacitors. Moreover, embodiments provided herein can provide low harmonic distortion with moderate switching frequency.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A multiplex winding synchronous power generating system, comprising:
a rotating part including a plurality of windings;
a primer mover configured to drive the rotating part;
a stator part having a plurality of windings; a plurality of rectifiers;
three 3-phase 5-level motor drives;
an asymmetric H-bridge;
at least one 3-phase AC motor;
a generator voltage regulator that regulates current of voltages of local DC busses of the three 3-phase 5-level motor drives, and
three cascaded H-bridges, wherein a respective one of the three H-bridges is configured with one of the three 3-phase 5-level motor drives.

2. The multiplex winding synchronous power generating system of claim 1, wherein the plurality of rectifiers comprise passive or active rectifiers.

3. The multiplex winding synchronous power generating system of claim 1, wherein the prime mover is an internal combustion engine.

4. The multiplex winding synchronous power generating system of claim 1, wherein the plurality of rectifiers are housed within a housing of the stator part.

5. The multiplex winding synchronous power generating system of claim 4, wherein the stator part, the rectifiers, and the rotating part are all housed within the same housing.

6. The multiplex winding synchronous power generating system of claim 1, further comprising a plurality of batteries electrically connected to the local DC busses and consequently to the three 3-phase 5-level motor drives.

7. The multiplex winding synchronous power generating system of claim 1, wherein the at least one 3-phase AC motor is three 3-phase AC motors and each of the three 3-phase AC motors is electrically connected to a separate one of the three 3-phase 5-level motor drives.

8. The multiplex winding synchronous power generating system of claim 1, wherein the plurality of rectifiers comprises six diodes.

9. A vehicle power system, comprising:
a multiplex winding synchronous power generating system comprising:
a rotating part including a plurality of windings;
a primer mover configured to drive the rotating part; a stator part having a plurality of windings;
a plurality of rectifiers; three 3-phase 5-level motor drives;
an asymmetric H-bridge;
at least one 3-phase AC motor;
a generator voltage regulator that regulates current of voltages of local DC busses of the three 3-phase 5-level motor drives; and
three cascaded H-bridges, wherein a respective one of the three H-bridges is configured with one of the three 3-phase 5-level motor drives.

10. The vehicle power system of claim 9, wherein the prime mover is an internal combustion engine of the vehicle.

11. The vehicle power system of claim 9, wherein the plurality of rectifiers comprise passive or active rectifiers.

12. The vehicle power system of claim 9, wherein the plurality of rectifiers are housed within a housing of the stator part.

13. The vehicle power system of claim 9, further comprising a plurality of batteries electrically connected to the local DC busses and consequently to the three 3-phase 5-level motor drives, wherein the three 3-phase 5-level motor drives may charge the plurality of batteries during motor regeneration.

14. The vehicle power system of claim 9, further comprising a plurality of batteries electrically connected to the three 3-phase 5-level motor drives, wherein the plurality of rectifiers are active rectifiers and wherein the plurality of batteries may charge by the plurality of active rectifiers.

15. The vehicle power system of claim 9, wherein the at least one 3-phase AC motor is three 3-phase AC motors and each of the three 3-phase AC motors is electrically connected to a separate one of the three 3-phase 5-level motor drives.

16. The vehicle power system of claim 9, further comprising a plurality of batteries and wherein the plurality of rectifiers are passive rectifiers, the plurality of batteries configured to allow starting of the vehicle from the batteries in case the passive rectifiers are replaced by active rectifiers located externally to the generator housing.

* * * * *